US006817226B2

(12) United States Patent
Subramanian et al.

(10) Patent No.: US 6,817,226 B2
(45) Date of Patent: Nov. 16, 2004

(54) SENSING ASSEMBLY AND METHOD OF MAKING SAME

(75) Inventors: Viswanathan Subramanian, El Paso, TX (US); Luis F Barron, El Paso, TX (US); Efren Solis, Chihuahua (MX); Duane Zedric Collins, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 28 days.

(21) Appl. No.: 10/391,883

(22) Filed: Mar. 18, 2003

(65) Prior Publication Data

US 2004/0182135 A1 Sep. 23, 2004

(51) Int. Cl.$^7$ .............................................. G01M 15/00
(52) U.S. Cl. ..................................... 73/35.01; 73/117.2
(58) Field of Search ............................ 73/35.01–35.07, 73/117.2, 117.3, 35.09, 35.11

(56) References Cited

U.S. PATENT DOCUMENTS

| | | | |
|---|---|---|---|
| 4,337,611 A | * 7/1982 | Mailander et al. | 460/7 |
| 5,852,234 A | * 12/1998 | Inoue et al. | 73/116 |
| 6,002,788 A | * 12/1999 | Luther | 382/133 |
| 6,538,429 B2 | 3/2003 | Schroeder et al. | |
| 6,546,780 B1 | 4/2003 | Palfenier et al. | |
| 6,554,318 B2 | 4/2003 | Kohut et al. | |
| 6,564,631 B1 | 5/2003 | Lake et al. | |
| 6,588,931 B2 | 7/2003 | Betzner et al. | |
| 6,604,429 B1 | 8/2003 | Pitzer | |
| 6,619,129 B2 | 9/2003 | Pitzer | |
| 6,639,399 B2 | 10/2003 | Schroeder et al. | |

FOREIGN PATENT DOCUMENTS

| | | | | |
|---|---|---|---|---|
| JP | 61017916 A | * | 1/1986 | G01K/11/08 |
| JP | 05273989 A | * | 10/1993 | G10K/11/16 |
| JP | 07248253 A | * | 9/1995 | G01H/11/08 |

\* cited by examiner

*Primary Examiner*—Edward Lefkowitz
*Assistant Examiner*—Jermaine Jenkins
(74) *Attorney, Agent, or Firm*—Jimmy L. Funke

(57) ABSTRACT

A sensing assembly identifies detonations in a plurality of cylinders of an internal combustion engine. The internal combustion engine includes an engine block. The sensing assembly includes a base that is fixedly secured to the engine block of the internal combustion engine. The sensing assembly also includes a sleeve that is fixedly secured to the base and extends outwardly therefrom. A sensor element extends around a portion of the sleeve. The sensor element receives vibrations generated by the detonations of the internal combustion engine and converts those vibrations into an electrical current. The sensing assembly includes a first terminal abutting the sensor element. The first terminal includes a first terminal pad directed in a first direction. The sensing assembly also includes a second terminal abutting the sensor element. The second terminal includes a second terminal pad directed in a second direction opposite the first direction such that leads connected to each of the first and second terminal pads are prevented from shorting the sensor element.

13 Claims, 3 Drawing Sheets

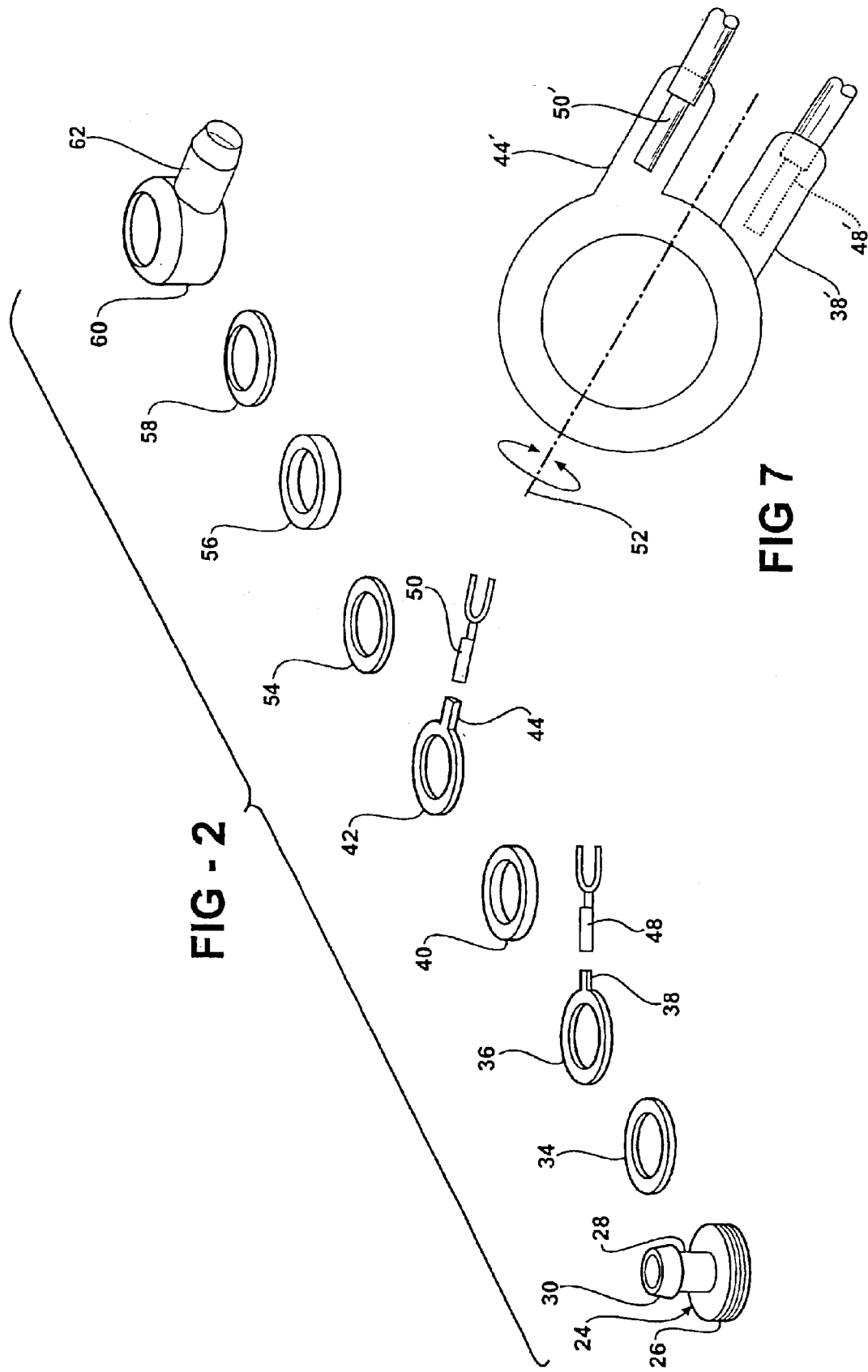

SENSING ASSEMBLY AND METHOD OF MAKING SAME

BACKGROUND ART

1. Field of the Invention

This invention relates to sensing assemblies for internal combustion engines. More particularly, the invention relates to a sensing assembly capable of being manufactured to produce fewer false positive occurrences of a sensed event in an internal combustion engine.

2. Description of the Related Art

Sensing assemblies are used throughout the internal combustion engine to measure and detect various parameters of the operation of the internal combustion engine. Given the harsh environment created by the internal combustion engine during its operation, especially when the internal combustion engine is used to power an automobile or other such vehicle, care must be taken to ensure the sensors are rugged enough to withstand the harsh environment. Even with such robust design considerations, the sensors must be sensitive enough to identify the parameters for which they are designed to sense.

Sensors designed to detect detonations, commonly referred to as "engine knocks," are typically mounted to an engine block or cylinder head. Vibrations generated by the internal combustion engine are received by the sensors during normal operation. In addition to these normal vibrations, the sensors must detect the detonations amongst the white noise generated by the internal combustion engine during normal operation. Wire leads that are connected to the detonation sensors are prone to shorting the electrical circuit resulting in the malfunctioning of the spark control system. It is, therefore, important to have electrical connections to the detonation sensor connected in a manner that would reduce the probability of having the detonation sensor shorted out of the electrical circuit.

Detonation sensors are typically configured in two ways. First, a cable with electrical leads are connected to the terminals of the detonation sensor using a connector at the end of the sensor. In the other configuration, the connector is integrated with the cable. In the situation where the detonation sensor includes the cable, each terminal of the detonation sensor has a thin portion protruding allowing the cable to be mechanically bonded thereto. Because the sensing unit is not very thick in the detonation sensors, strands of wire could potentially cause an electrical short across those terminals. In addition, this detonation sensor configuration requires the two terminals of the detonation sensor are typically designed independently of each other requiring an inventory to be maintained for each of those two terminals.

SUMMARY OF THE INVENTION

A sensing assembly identifies detonations in a plurality of cylinders of an internal combustion engine. The internal combustion engine includes an engine block. The sensing assembly includes a base that is fixedly secured to the engine block of the internal combustion engine. The sensing assembly also includes a sleeve that is fixedly secured to the base and extends outwardly therefrom. A sensor element extends around a portion of the sleeve. The sensor element receives vibrations generated by the detonations of the internal combustion engine and converts those vibrations into an electrical current. The sensing assembly includes a first terminal abutting the sensor element. The first terminal includes a first terminal pad directed in a first direction. The sensing assembly also includes a second terminal abutting the sensor element. The second terminal includes a second terminal pad directed in a second direction opposite the first direction such that leads connected to each of the first and second terminal pads are prevented from shorting the sensor element.

BRIEF DESCRIPTION OF THE DRAWINGS

Advantages of the invention will be readily appreciated as the same becomes better understood by reference to the following detailed description when considered in connection with the accompanying drawings, wherein:

FIG. 2 is an exploded perspective view of the invention;

FIG. 7 is a top view of an alternative embodiment of the sensing elements.

DETAILED DESCRIPTION OF THE PREFERRED EMBODIMENT

Figure 1:
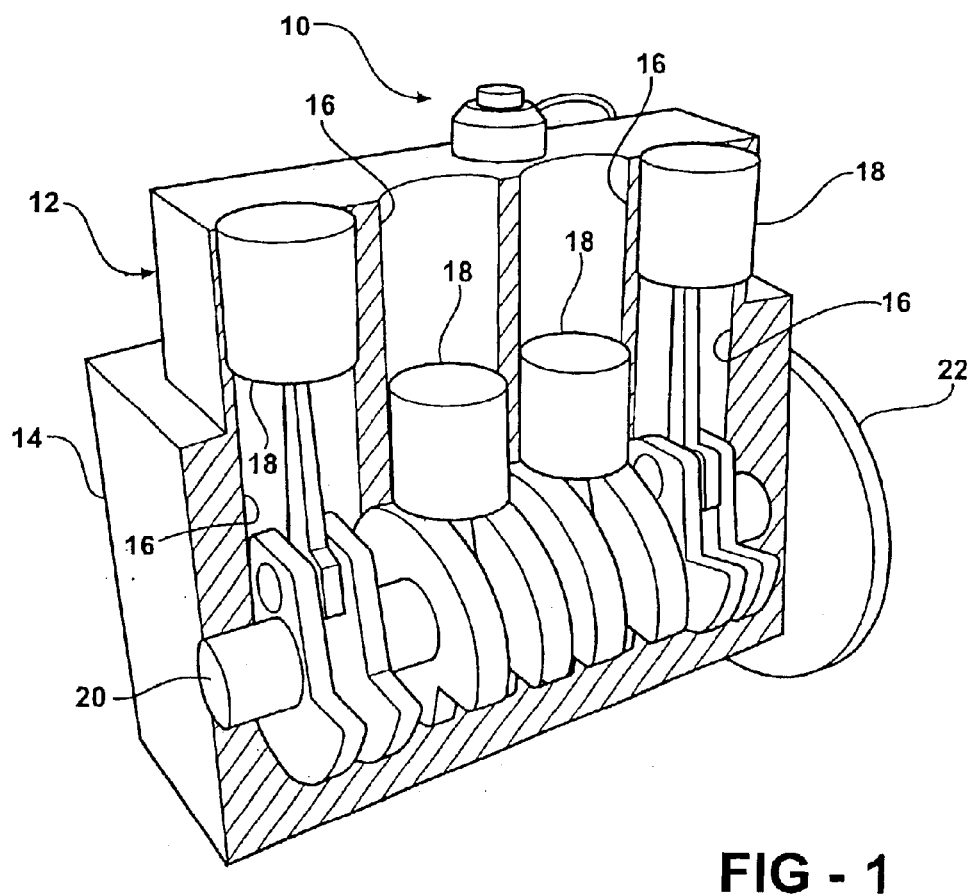
FIG. 1 is a cross-sectional perspective view of an internal combustion engine incorporating one embodiment of the invention.

Referring to FIG. 1, one embodiment of the invention is generally indicated at 10. The invention is a sensing assembly 10 that is fixedly secured to an internal combustion engine, generally shown at 12, having an engine block 14. The internal combustion engine 12 is an I-4 engine and is characterized by having four cylinders 16 configured such that they are in line with each other. The sensing assembly 10 is positioned between the second and third cylinders 16. It should be appreciated by those skilled in the art that the sensing assembly 10 may be used in several types of internal combustion engines having various numbers of cylinders 16. Each cylinder 16 includes a piston 18 that moves when fuel injected into the cylinders 16 is combusted. The combustion of the fuel moves the pistons 18 which, in turn, moves a crank shaft 20 that provides an output power to be utilized by the host assembly, typically an automobile. A flywheel 22 is fixedly secured to the crank shaft 20 and rotates with the crank shaft 20 allowing the pistons 18 to move smoothly.

The sensing assembly 10 identifies detonations in each of the cylinders 16. When fuel is introduced into the cylinder 16, combustion occurs to propel the pistons 18 downwardly allowing it to rotate the crank shaft. Detonation of fuel inside a cylinder 16 occurs when the fuel inside the cylinder 16 ignites at a non-ideal time. This prevents the fuel to be utilized in a maximum fashion. In addition, a detonation of fuel inside the cylinder 16 results in more pollutants leaving the internal combustion engine through an exhaust mechanism (not shown). A detonation of fuel is commonly referred to as a knock or engine knock. The sensing assembly 10 senses when detonations occur, allowing the engine control unit to modify the operation of the internal combustion engine 12 to minimize or eliminate the detonations produced therein.

Only one sensing assembly 10 is needed for the internal combustion engine 12. The output signal of the sensing assembly 10 is sent to the engine control unit where it is aligned with a timing signal to determine which of the plurality of cylinders 16 had the detonation therein. Typically, the timing signal is generated by the camshaft (not shown). The crank shaft 20 may also generate a timing signal that may be used by engine control unit to time the signal received from the sensing assembly 10.

Figure 4:
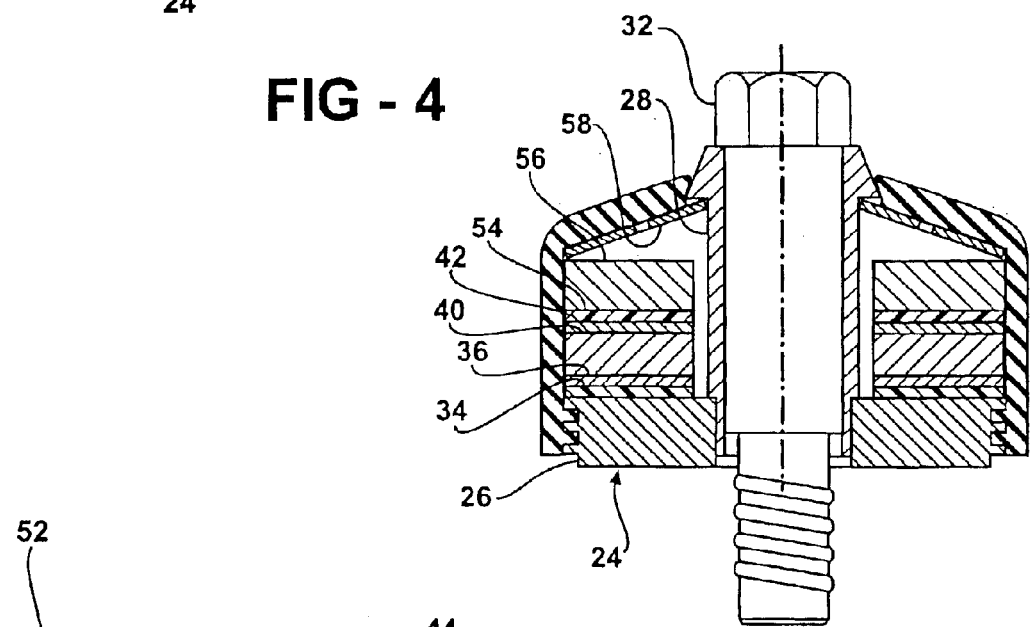
FIG. 4 is a cross-sectional side view of the invention with a fastener extending therethrough.

Referring to FIG. 2, an exploded view of the sensing assembly 10 is generally shown. The sensing assembly includes a base 24. The base 24 is fixedly secured to the engine block 14 of the internal combustion engine 12. The base 24 includes a grooved portion 26, a sleeve 28 extending outwardly therefrom, and a sleeve end 30 including a frustoconical end extending around the sleeve 28 opposite the grooved portion 26. As shown in FIG. 4, a bolt 32 extends through the sleeve 28 to secure the sensing assembly 10 to the engine block 14. In the embodiment shown, the sleeve 28 extends upwardly away from the base 24. It should be appreciated by those skilled in the art that the sleeve 28 may be configured in a number of different ways, including without limitation replacing the frustoconical end with a threaded end.

An insulator 34 is slipped over the sleeve 28 and onto the base 24. The insulator 34 rests on the grooved portion 26 thereof. The insulator 34 is circular in shape and is fabricated of a material that will not conduct electricity.

A first terminal 36 rests on the insulator 34 when it is placed over the sleeve 28. Like the insulator 34, the first terminal 36 is substantially circular in shape. The first terminal 36 does include a first terminal pad 38. The first terminal pad 38 extends out from the first terminal 36 radially therefrom. The first terminal pad 38 extends out from the base 24 in a first direction. In the embodiment shown, the first direction is downwardly toward the base 24. It should be appreciated that the first terminal pad 38 may extend outwardly from the first terminal 36 in directions other than radial without avoiding the scope of the invention. By way of example, a terminal pad may extend parallel to a line tangent to the terminal taken from a point on the terminal that has a radius perpendicular to the terminal pad.

A sensing element 40 is fixedly secured to the base 24. The sensing element 40 is also circular in shape. The sensor element 40 extends around at least a portion of the sleeve 28. In the preferred embodiment shown in the Figures, the sensor element 40 extends around the entire periphery of the sleeve 28. The sensor element 40 is a piezoelectric transducer. This allows the sensor element 40 to receive vibrations generated by detonations of the internal combustion engine 12 and to convert those vibrations into an electrical current.

Figure 5:
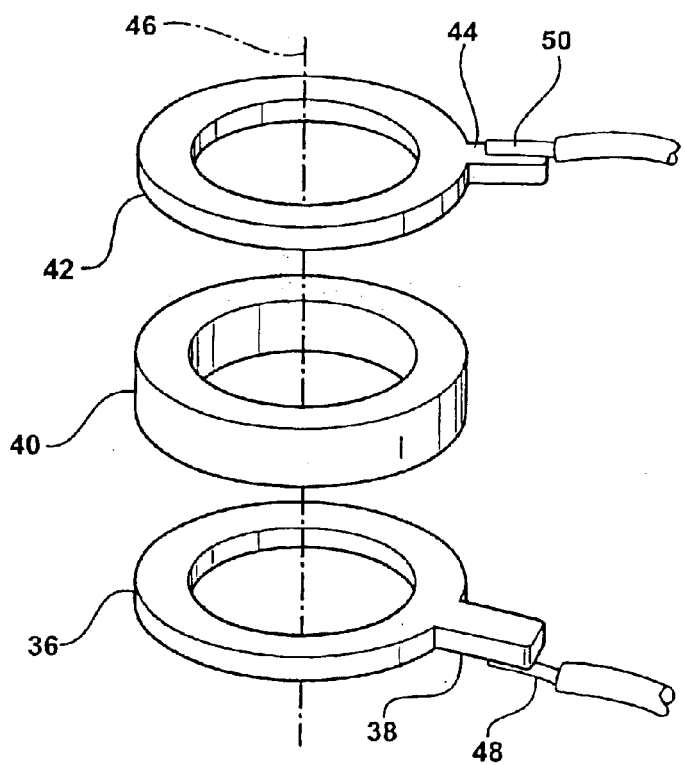
FIG. 5 is an exploded perspective view of the sensing elements incorporating the invention.
Figure 6:
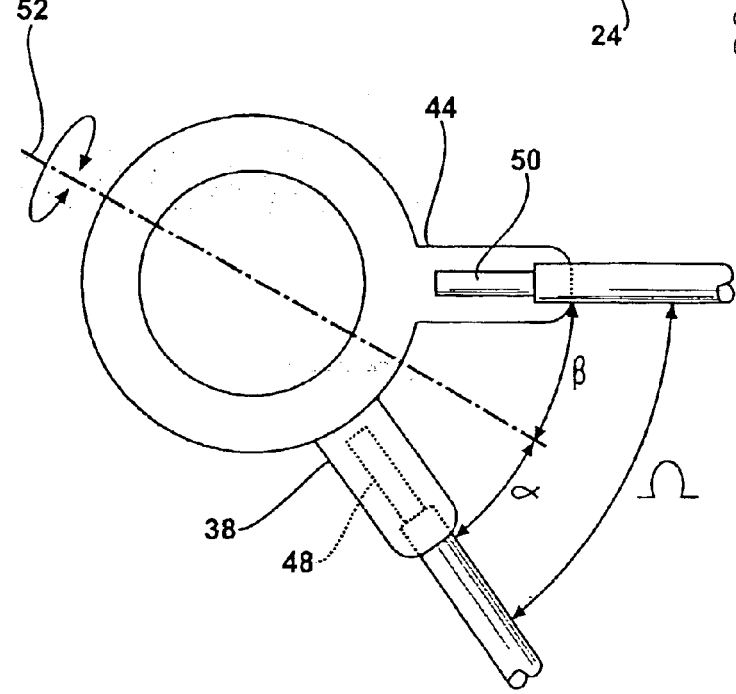
FIG. 6 is a top view of the sensing elements and the axis of rotation for the sensing assembly.

Extending around the sleeve 28 on the other side of the sensor element 40 is a second terminal 42. The second terminal 42 is circular in design and extends over the sleeve 28 above the sensor element 40. The second terminal includes a second terminal pad 44 that extends radially out from the second terminal 42. It should be appreciated that the first 36 and second 42 terminals are identical and only their orientation on assembly is different. This reduces inventory costs. The second terminal pad 44 extends out from the second terminal 42 in a direction opposite that of the first direction for the first terminal pad 38. More specifically, the second terminal pad 44 mirrors the first terminal pad 38. Referring specifically to FIGS. 5 and 6, it may be seen that the first 38 and second 44 terminal pads extend oppositely from each other with the second terminal pad 44 extending upwardly away from the base 24.

As shown in the Figures, a first terminal pad 38 extends in a downward direction, whereas the second terminal pad 44 extends in an upward direction. It should be appreciated by those skilled in the art that the upward and downward orientation of the first 38 and second 44 terminal pads are illustrative in nature. The terminal pads 38, 44 could be oriented laterally in quadrature with those shown in the Figures such that the faces of the terminal pads 38, 44 extend through plains parallel to a longitudinal axis 46 of the sensing assembly 10. The importance of having the terminal pads 38, 44 extending in opposite directions is that it allows a first lead 48 to be secured to the first terminal pad 38 with little likelihood that wires from the first lead 48 may contact wires of a second lead 50 which are protected by the second terminal pad 44. More specifically, it is less likely that the first 48 and second 50 leads would contact each other if they are secured to surfaces that do not face each other, as is the case with the first terminal pad 38 and the second terminal pad 44.

In addition to the terminal pads 38, 44 extending in opposite directions, the first terminal pad 38 is oriented with respect to the base 24 such that it extends radially out therefrom at a first angle α with respect to an axis of rotation 52. Likewise, the second terminal pad 44 extends out from the base 24 at a second angle β with respect to the axis of rotation 52. The first angle α and the second angle β differ from each other. More specifically, the first angle α and the second angle β are equal in degree but opposite in direction with respect to the axis of rotation 52, as shown in FIG. 6. The first angle α and the second angle β combine to create a separation angle Ω, which is bisected by the angle of rotation 52. In the alternative embodiment discussed above, the separation angle Ω would be defined by sides that extend from the longitudinal axis to the end of the terminal pads, since the terminal pads in the alternative embodiment are parallel.

Figure 3:
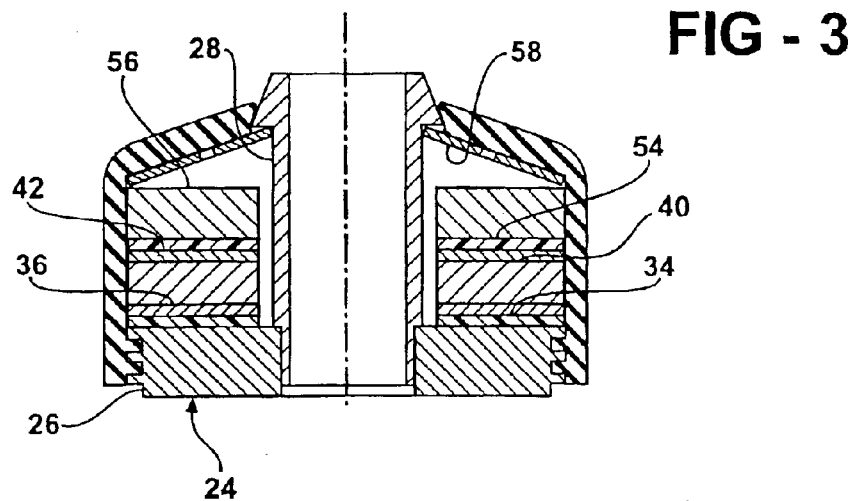
FIG. 3 is a cross-sectional side view of a sensing assembly incorporating the invention.

Referring back to FIGS. 2 through 4, an insulator 54 is secured to the sensing assembly 10 over the sleeve 28 where it abuts the second terminal 42 at a position opposite that of the sensor element 40. A load washer 56 and a spring washer 58 are placed over the insulator 54, respectively. Both the load washer 56 and the spring washer 58 extend over the sleeve 28. A nut 59 extends over the spring washer 58.

A cover 60 extends over the entire sensing assembly 10 and protects the sensing assembly from the hostile environment created by the internal combustion engine 12. And finally, as discussed above, a bolt 32 extends down over the cover 60 and secures the entire sensing assembly 10 to the internal combustion engine 12 in a manner allowing it to sense detonations occurring in the cylinders 16 of the internal combustion engine 12. It should be appreciated by those skilled in the art that the types of nuts 59, load washers 56, spring washers 58 and insulators 34, 54 may vary as is deemed necessary for a particular design of an internal combustion engine 12 or sensing assembly 10.

The cover 60 includes an overmolded sleeve 62. The sleeve 62 is oblong in shape to receive both terminal pads 38, 44 therein. This prevents the terminals 36, 42 from being assembled in the wrong position or orientation. If the terminals 36, 42 are assembled incorrectly, they will protrude from the overmolded sleeve 62.

Referring to FIG. 7, wherein like primed numerals represent similar elements in the embodiment shown in FIGS. 1 through 6, the first terminal pad 38' and the second terminal pad 44' are parallel to each other. In addition, the first 38' and second 44' terminal pads are parallel to the axis of rotation 52'. This allows the first 48' and second 50' leads to come straight into the overmolded cover 62, offset from each other vertically and horizontally.

A method for securing wire leads 48, 50 to the sensing assembly 10 includes the step of resistance welded or crimped one of the wire leads 48, 50 to one of the first 38 and second 44 terminal pads. The sensing assembly 10 is then rotated about the axis of rotation 52. The remaining wire lead 48, 50 is then soldered to the other of the first 38 and second 44 terminal pads. Once the wire leads 48, 50 are soldered to the terminal pads 38, 44, the first terminal 36 is secured to the base with the first terminal pad 38 disposed at a first predetermined orientation. The sensor element 40 is then assembled to the first terminal 36. The second terminal 42 is then mounted to sensor element 40 with the second terminal pad 44 disposed at a second predetermined orientation such that the first 38 and second 44 terminal pads create the separation angle Ω therebetween.

The method includes the step of placing the cover 60 over the sensing assembly 10. The cover 60 includes a pad sleeve 62 that extends out from the body of the cover 60 to cover the terminal pads 38, 44 to help ensure the wire leads 48, 50 are not shorted together.

By equally spacing the first terminal pad 38 and the second terminal pad 44 from the axis of rotation 52, the tool used to soldering the wire leads 48, 50 to the terminal pads 38, 44 does not have to move. This further simplifies the method of assembly when the first and second angles for the first and second orientations are equal.

In an alternative embodiment, the terminal pads 38, 44 wherein the radial length of the first and second terminals 38, 44 is shorter than the width as the first α and second β angles grow. More specifically, because it is desired to have a single pad sleeve 62, the angle Ω between the first terminal pad 38 and the second terminal pad 44 may grow requiring the wire leads 48, 50 to bend once they enter the pad sleeve 62. Therefore, it is required that the widths of the terminal pads 38, 44 are greater than the radial lengths of the terminal pads 38, 44.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A sensing assembly for identifying detonations in a plurality of cylinders of an internal combustion engine having an engine block, said sensing assembly comprising:

a base fixedly secured to the engine block of the internal combustion engine;

a sleeve fixedly secured to said base and extending outwardly therefrom;

a sensor element extending around a portion of said sleeve, said sensor element receiving vibrations generated by the detonations of the internal combustion engine and converting same into an electrical current;

a first terminal abutting said sensor element, said first terminal including a first terminal pad directed in a first direction; and a second terminal abutting said sensor element, said second terminal including a second terminal pad directed in a second direction opposite said first direction such that leads connected to each of said first and second terminal pads are prevented from shorting said sensor element.

2. A sensing assembly as set forth in claim 1 wherein said first terminal extends radially out from said base at a first angle and said second terminal extends radially out from said base at a second angle such that said first angle differs from said second angle.

3. A sensing assembly as set forth in claim 2 including a cover molded to cover said sensing assembly.

4. A sensing assembly as set forth in claim 3 wherein said cover includes a pad sleeve to cover said first and second terminal pads.

5. A sensing assembly as set forth in claim 4 wherein said first and second terminal pads are rectangular in shape defining a radial length and a width.

6. A sensing assembly as set forth in claim 5 wherein said radial length of said first and second terminal pads is longer than said width when said first angle differs from said second angle less than a predetermined amount.

7. A sensing assembly as set forth in claim 5 wherein said radial length of said first and second terminal pads is shorter than said width when said first angle differs from said second angle more than a predetermined amount.

8. A sensing assembly for identifying detonations in a plurality of cylinders of an internal combustion engine having an engine block, said sensing assembly comprising:

a base fixedly secured to the engine block of the internal combustion engine, said base defining a longitudinal axis;

a sleeve fixedly secured to said base and extending outwardly therefrom;

a sensor element extending around a portion of said sleeve, said sensor element receiving vibrations generated by the detonations of the internal combustion engine and converting same into an electrical current;

a first terminal abutting said sensor element, said first terminal including a first terminal pad extending radially out from said base at a first angle; and a second terminal abutting said sensor element, said second terminal including a second terminal pad extending radially out from said base at a second angle differing from said first angle.

9. A sensing assembly as set forth in claim 8 including a cover molded to cover said sensing assembly.

10. A sensing assembly as set forth in claim 9 wherein said cover includes a pad sleeve to cover said first and second terminal pads.

11. A sensing assembly as set forth in claim 10 wherein said first and second terminal pads are rectangular in shape defining a radial length and a width.

12. A sensing assembly as set forth in claim 11 wherein said radial length of said first and second terminal pads is longer than said width when said first angle differs from said second angle less than a predetermined amount.

13. A sensing assembly as set forth in claim 12 wherein said radial length of said first and second terminal pads is shorter than said width when said first angle differs from said second angle more than a predetermined amount.

* * * * *